United States Patent [19]

Sumita et al.

[11] Patent Number: 5,126,949

[45] Date of Patent: Jun. 30, 1992

[54] NUMERICALLY CONTROLLED ELECTRIC DISCHARGE MACHINING SYSTEM

[75] Inventors: Mitsutaka Sumita; Kazuaki Hino, both of Aichi, Japan

[73] Assignee: Mitsubishi Denki K.K., Tokyo, Japan

[21] Appl. No.: 405,817

[22] Filed: Sep. 8, 1989

[30] Foreign Application Priority Data

Sep. 12, 1988 [JP] Japan .................... 63-226567

[51] Int. Cl.⁵ ............................. G06F 15/46
[52] U.S. Cl. ....................... 364/474.04; 364/143; 340/309.15
[58] Field of Search ........ 364/474.04, 474.11, 364/474.01, 143, 145; 377/16, 20; 340/309.5-309.6; 318/567, 569

[56] References Cited

U.S. PATENT DOCUMENTS 4,319,319  3/1982  Wygant .................. 364/143
4,692,856  9/1987  Komiya .................. 364/474.11
4,853,867  8/1989  Matsumura ............... 364/474.11
4,868,760  9/1989  Obara .................... 364/474.04

Primary Examiner—Jerry Smith
Assistant Examiner—Jim Trammell
Attorney, Agent, or Firm—Sughrue, Mion, Zinn, Macpeak & Seas

[57] ABSTRACT

A numerically controlled electric discharge machining system high in operability. An instruction command such as a machining operation start time and the contents of machining operations are specified with particular NC codes included in an NC program, so that the machining operation is carried out automatically.

3 Claims, 3 Drawing Sheets

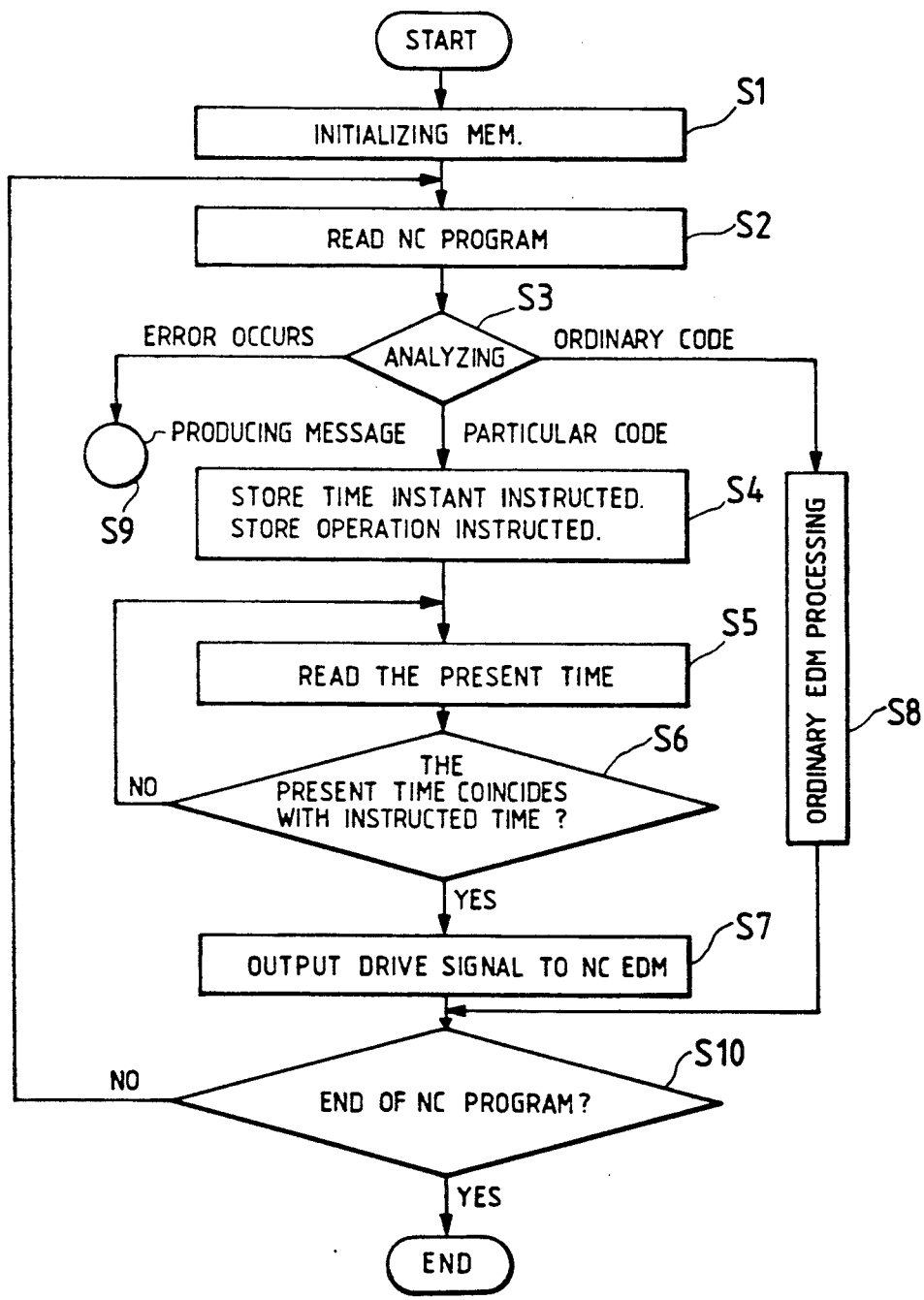

NUMERICALLY CONTROLLED ELECTRIC DISCHARGE MACHINING SYSTEM

BACKGROUND OF THE INVENTION

The present invention relates to numerically controlled electric discharge machines, and more particularly to a numerically controlled electric discharge machining system in which, in a machining operation instructed according to a numerical control program, a machining time can be controlled.

FIG. 1 is a block diagram showing the arrangement of a control circuit for a conventional numerically controlled electric discharge machine system (hereinafter referred to as "an NC EDM system", when applicable).

In FIG. 1, reference character 1A designates a microprocessor for processing data which are applied thereto from a paper tape input-output unit 3, or from a keyboard 6, or through an input-output unit 7 from a flexible disc 8 (hereinafter referred to as "a CPU 1A", when applicable); 2, a memory unit for storing data, the memory unit 2 comprising a read-only memory section (hereinafter referred to as "a ROM section", when applicable) in which the control program of the CPU 1A is stored, and a memory section for writing and reading data (hereinafter referred to as "a RAM section", when applicable); 3, the aforementioned paper tape input-out unit for punching a paper tape or reading data out of the paper tape thus punched; 4, a display unit for displaying data on it (hereinafter referred to as "a CRT 4", when applicable); 5A, a time integrating meter for detecting a machining time etc.; 6, the aforementioned keyboard for inputting data and commands; 8, the aforementioned flexible disc for transmitting and receiving data through the input-output unit 7; 9, a data bus for transmitting data; and 10, the NC electric discharge machine.

The operation of the control circuit shown in FIG. 1 will be described. A numerical control program (hereinafter referred to as "an NC program", when applicable) ,is applied from the paper tape input-output unit 3, or from the keyboard, or through the input-output unit 7 from the flexible disk 8 to the CPU 1A, where it is analyzed into numerical control data for driving the NC electric discharge machine 10. The NC data thus obtained is transmitted through the data bus 9 to the NC electric discharge machine 10. When a time reading command is issued according to the NC program, the CPU 1A reads the present integrated time, and stores it in the RAM section of the memory unit 2. Owing to this time reading function, a necessary machining time can be calculated by executing a time reading command immediately before the start of a machining operation and immediately after the end of the machining operation.

In the conventional NC EDM system thus organized, a machining time etc. can be calculated automatically, but a machining procedure including the starting of the NC electric discharge machine etc. has not been automated yet. Accordingly, operations such as the starting of the NC electric discharge machine, the injecting of a machining solution, and the starting of a machining operation have to be manually carried out.

SUMMARY OF THE INVENTION

Accordingly, an object of this invention is to eliminate the above-described difficulties accompanying a conventional NC electric discharge machine. More specifically, an object of the invention is to provide an NC EDM system in which, upon an occurrence of the time instant specified by the NC program, a predetermined operation is automatically carried out (for instance, the machining solution is injected, and the machining operation is started); that is, the time control of the machining steps according to the NC control is positively effected.

The above, and other objects of the present invention are accomplished by the provision of a numerically controlled electric discharge machining system comprising: a numerically controlled electric discharge machine for machining a workpiece with electric discharges, data inputting means for inputting a numerical control program used to control said electric discharge machine, said numerical control program including particular numerical control codes specifying a machining operation start time and the contents of an operation of said electric discharge machine, means for outputting an absolute time instant, data processing means for analyzing said numerical control program and particular numerical control codes inputted by said data inputting means, and detecting whether or not said machining operation start time specified with said particular numerical control codes coincides with said absolute time instant provided by said outputting means, and control means for applying, when said data processing means detects that said machining operation start time coincides with said absolute time instant, numerical control data to said electric discharge machine to control the operation of said electric discharge machine.

In the NC EDM system according to the invention, the machining operation start time and the contents of operation of the NC electric discharge machine are specified with the particular NC codes included in the NC program, and when the machining operation start time coincides with the actual time instant provided by the time piece, the NC electric discharge machine is controlled according to the contents of operation thus specified and the NC program. That is, with the NC EDM system of the invention, merely by the setting the workpiece on the system, the electric discharge machine is driven automatically at the predetermined time instant according to the NC program. Thus, the machining operation is automated, and the time control of the machining steps can be readily achieved.

BRIEF DESCRIPTION OF THE DRAWINGS

In the accompanying drawings:

FIG. 3 an operating flow chart of a CPU in the NC electric discharge machine system according to the invention.

DESCRIPTION OF THE PREFERRED EMBODIMENTS

Figure 1:
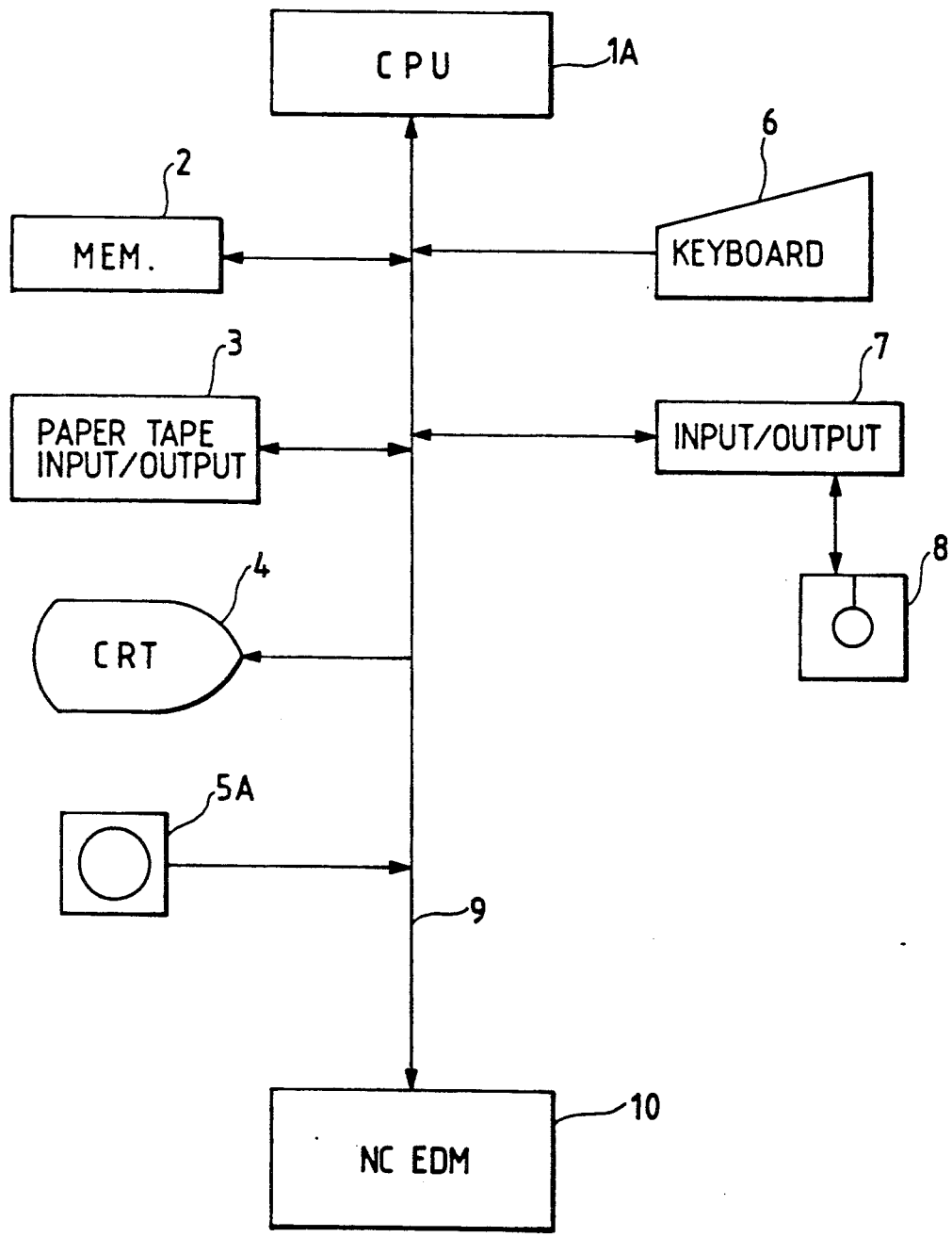
FIG. 1 is a block diagram showing the arrangement of a conventional NC electric discharge machine system.
Figure 2:
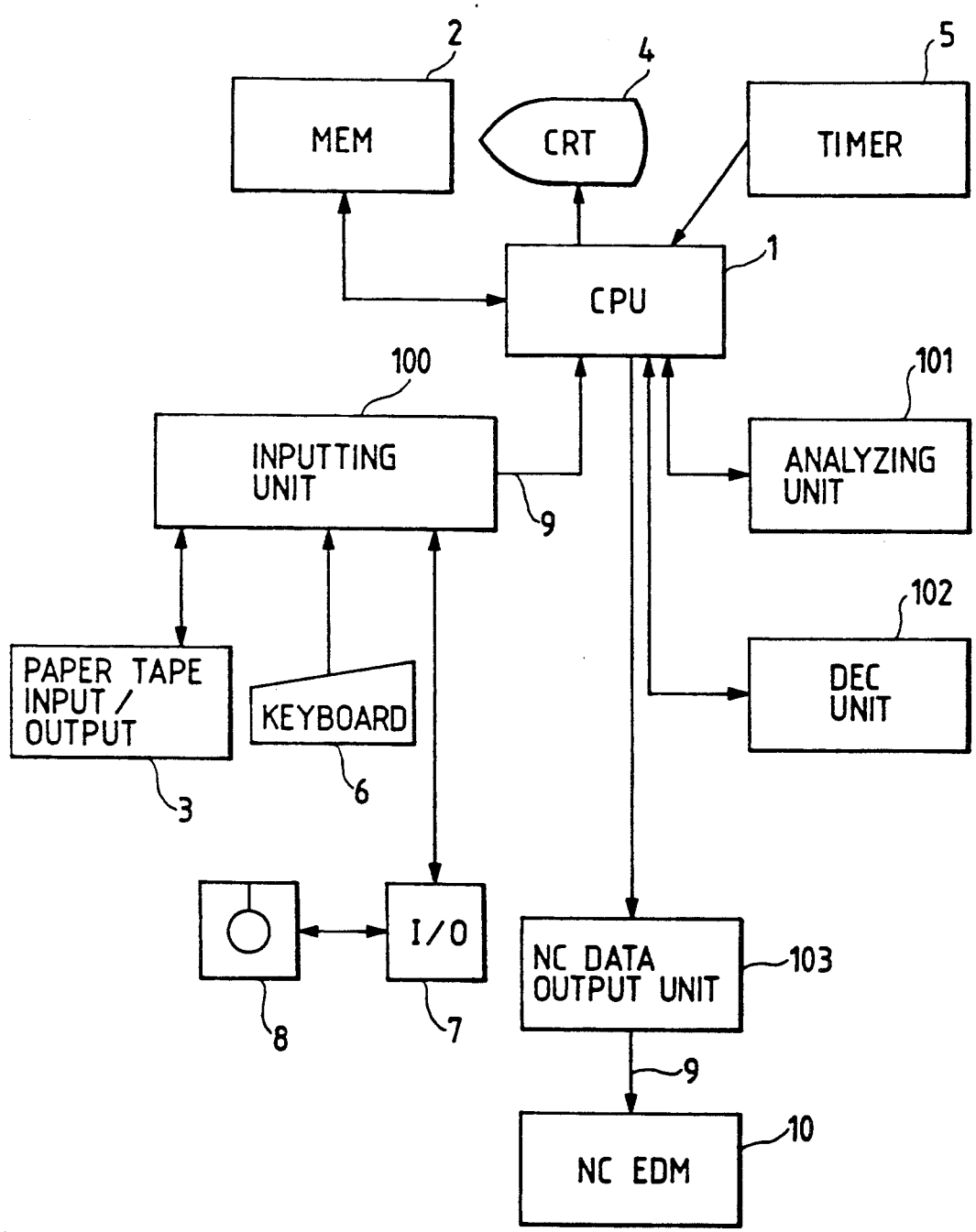
FIG. 2 is a block diagram showing the arrangement of an NC electric discharge machine system according to this invention.

FIG. 2 is a block diagram showing the arrangement of an NC EDM system according to the present invention. In FIG. 2, reference numerals 2 through 4 and 6 through 10 designate the same elements as those in FIG. 1. Further in FIG. 2, reference numeral 1 designates a CPU which processes data supplied through an input unit 100 for inputting a numerical control program and specific numerical control codes from the paper tape input-output unit 3, or from the keyboard 6, or through the input-output unit 7 from the flexible disc 8, and which controls an analyzing unit 101 for analyzing the NC control program and the specific NC codes, a unit 102 for detecting coincidence with an absolute time instant and a unit 103 for outputting the NC data to perform operations according to a flow chart shown in FIG. 3; and 5, a time piece built into the NC electric discharge machine, for outputting the actual time instant.

FIG. 3 is an operating flow chart of the CPU in the NC electric discharge machine system according to the invention.

The operation of the NC EDM system of FIG. 2 will be described with reference to FIG. 3.

(1) In Step S1;

In Step S1, before analyzing an NC program inputted, the CPU 1 initializes the working area in the RAM section of the memory unit 2 in which particular NC codes according to the invention are stored. Then, Step 1 advances to the following Step 2.

(2) In Steps S2, S3, S8 and S9

After initializing the working area in the RAM section in Step S1, in Step S2 the CPU 1 reads the NC program from a top, which is supplied through the unit 100 from the paper tape input-output unit 3 or through the input-output unit 7 from the flexible disc 8, and in Step S3 the CPU 1 controls the analyzing unit 101 to analyze the NC program step by step from the top to determine whether it is of the particular NC codes according to the invention or of the ordinary NC codes, or of the NC codes due to errors. When it is of the ordinary NC codes, Step S8 is effected; that is, the CPU instructs through the NC data outputting unit 103 the NC electric discharge machine to operate in the ordinary manner. When it is of the particular NC codes, Step S3 is allowed to advance to Step S4; and when it is of the NC codes due to errors, Step S3 is switched over to Step S9. In Step S9, the CPU applies an error message to the CRT unit 4, and suspends the analysis.

(3) In Step S4

When, in Step S3, the analysis results in the particular NC codes according to the invention, in Step S4 the CPU 1 stores the operation start time instant and the contents of operation to be carried out by the NC electric discharge machine, which are specified by the particular NC codes, in the working area of the RAM section in the memory unit 2, which has been initialized in Step S1. Then, Step S4 advances to Step S5.

(4) In Step S5 and S6

In Step S5, the CPU 1 reads the present time instant from the time piece 5 which outputs the absolute time instant. Then, Step S6 is effected. In Step S6, the operation start time instant stored in the RAM section is compared with the present time instant thus read by the unit 102. When the present time instant coincides with the operation start time instant, Step S7 is effected. If not, Step S5 is effected again. This operation is repeatedly carried out until the two time instants coincide with each other.

(5) In Step S7

In Step S7, in order to drive the NC electric discharge machine 10, the CPU 1 converts the contents of operation stored in the RAM section of the memory unit 2 into signals which can be read by the electric discharge machine 10, and sends them through the unit 103 to the latter 10. Thereafter, Step S10 is effected.

(6) In Step S10

In Step S10, upon completion of one step of the NC program, the CPU 1 controls the unit 101 to determine whether or not the end code of the NC program is available. If the end code is not available, then Step S2 is effected again, so that the following one step of the NC program is read and analyzed. When, the end code is available, the operation according to the NC program is ended.

If the workpiece machined is left as it is, then it will rust. Therefore, in the case where it is known when the machining of the workpiece is completed, the machining operation start time should be taught to the electric discharge machine so that the machining operation is ended when, for instance, the operator for the morning shows up.

Furthermore, it is preferable that the instruction to the electric discharge machine is made so that the machining operation is started when the machining solution injected has been made constant in temperature. This method is advantageous in that the workpiece can be machined under the condition that the machining solution is substantially constant in temperature, with the result that the machined workpiece is higher in quality than machined by the conventional method.

As was described above, in order to operate the NC electric discharge machine, according to the invention, the machining operation start time and the contents of machining operation are specified with the particular NC codes included in the NC program, and it is determined whether or not the machining operation start time thus specified coincides with the absolute time instant provided by the time piece. Therefore, the time instants of various machining steps (such as the step of turning on the power switch of the NC electric discharge machine, the step of injecting the machining solution, and the steps of starting the machining operation) according to the NC program can be effectively controlled. That is, the NC electric discharge machine system is improved in operability and can effectively perform the machining operation with high accuracy.

What is claimed is:

1. A numerically controlled electric discharge machining system comprising:
   a numerically controlled electric discharge machine for machining a workpiece with electric discharges;
   data inputting means for inputting a numerical control program used to control said electric discharge machine, said numerical control program including particular numerical control codes specifying a machining operation start time and the contents of an operation of said electric discharge machine;
   means for outputting an absolute time instant;
   data processing means for analyzing said numerical control program and particular numerical control codes inputted by said data inputting means, and detecting whether or not said machining operation start time specified with said particular numerical control codes coincides with said absolute time instant provided by said outputting means; and
   control means for applying, when said data processing means detects that said, machining operation start time coincides with said absolute time instant, numerical control data to said electric discharge machine to control the operation of said electric discharge machine.

2. The system of claim 1 wherein the absolute time instant is the present time.

3. A numerical control method for a numerically controlled electric discharge machining system comprising the steps of:
   (a) initializing a memory means for storing a numerical control program;
   (b) reading a numerical control program having a plurality of steps and a plurality of control codes into said storing means;
   (c) analyzing at least one of said steps of said numerical control program;
   (d) controlling said numerically controlled electric discharge machining system based on said numerical control program and at least one operator input when said numerical control program consists of only ordinary numerical control codes;
   (e) controlling said numerically controlled electric discharge machining system responsive to said numerical control program when said numerical control program includes a particular numerical control code, said controlling step (c) further comprising the steps of:
      (i) storing said numerical control code and an operation start time instant in said memory means; and
      (ii) when an absolute time instant generated by a means for outputting said absolute time instant coincides with said operation start time instant, controlling said numerically controlled electric discharge machining system responsive to said numerical control program stored in said memory means;
   (f) generating an error message when said numerical control program includes at least one error; and
   (g) repeating steps (b) through (f) for each of said steps of said numerical control program until said numerical control program includes an end code.

* * * * *